United States Patent [19]
Nakajima

[11] 4,283,080
[45] Aug. 11, 1981

[54] FLANGE FOR A DUCT

[76] Inventor: Kenji Nakajima, 3-5, 6-chome, Nagayoshi-deto, Hirano-ku, Osaka-shi, Osaka-fu, Japan

[21] Appl. No.: 109,186

[22] Filed: Jan. 2, 1980

[51] Int. Cl.³ ............................................ F16L 23/00
[52] U.S. Cl. .................................. 285/405; 285/424
[58] Field of Search ............... 285/337, 405, 413, 414, 285/415, 424, 363

[56] References Cited
U.S. PATENT DOCUMENTS

| | | | |
|---|---|---|---|
| 696,603 | 4/1902 | Smith | 285/414 X |
| 2,498,753 | 2/1950 | Deitsch | 285/424 X |
| 2,679,410 | 5/1954 | Boughton | 285/337 X |

FOREIGN PATENT DOCUMENTS 1099744  1/1968  United Kingdom ................. 285/337

*Primary Examiner*—Dave W. Arola
*Attorney, Agent, or Firm*—Wenderoth, Lind & Ponack

[57] ABSTRACT

A flange for coupling one duct with another. The flange has four flange pieces, each of which has two walls connected so as to form an L-shaped section. One of the two walls has at one end thereof an extension. At the other end of the flange piece, the other of the two walls is provided with a hook.

3 Claims, 4 Drawing Figures

U.S. Patent    Aug. 11, 1981    4,283,080
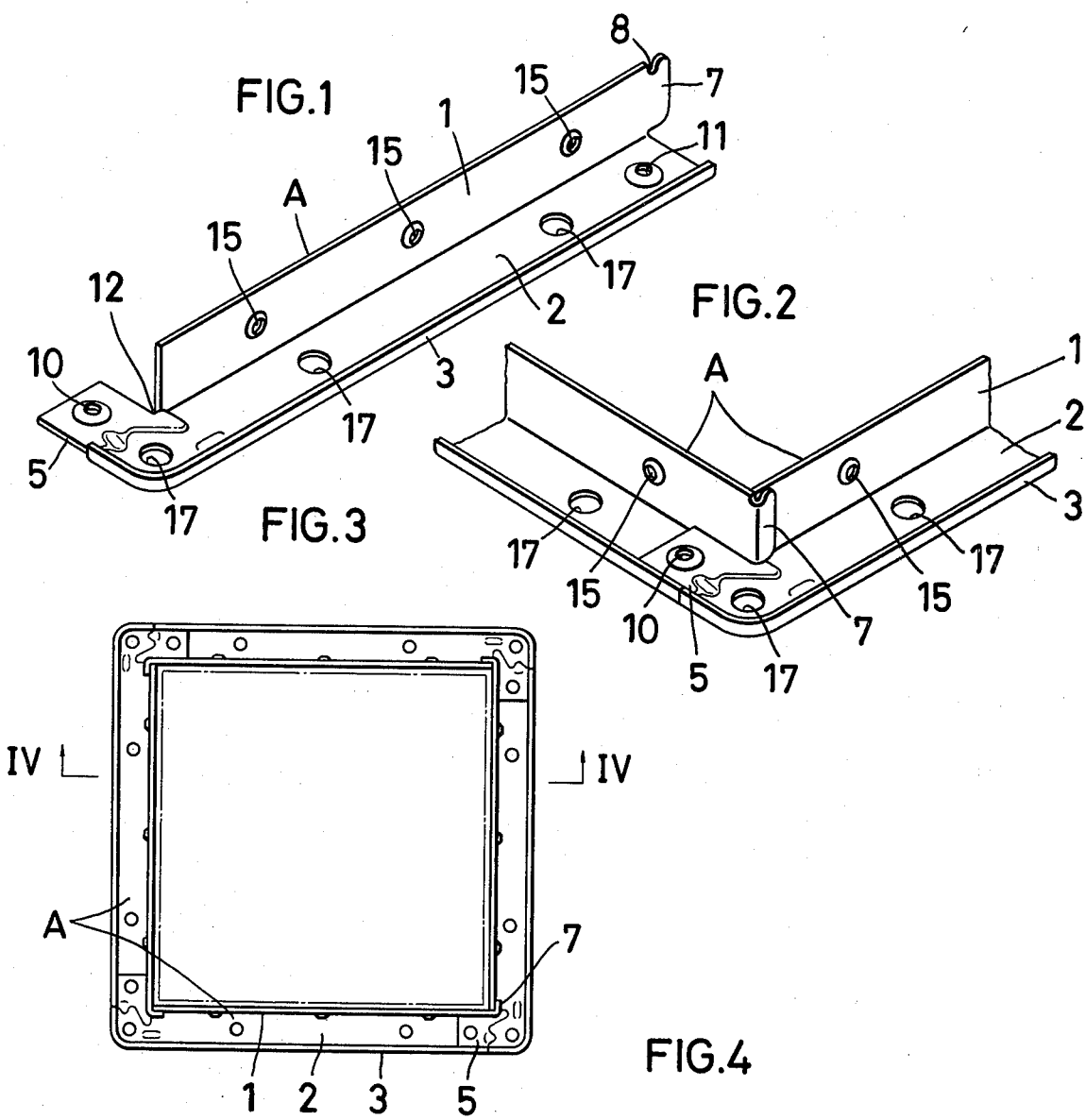
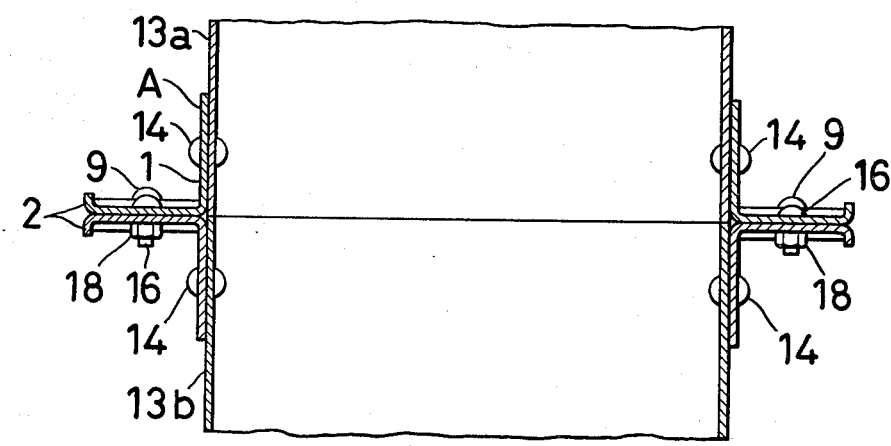

FLANGE FOR A DUCT

The present invention relates to an improved flange to be mounted on the end of a duct to couple it to another duct.

It is an object of the present invention to provide flange which can be easily assembled and mounted on the end of a duct at the job site.

It is another object of the present invention to provide a flange having sufficient mechanical strength even though it is made of strip steel.

With these objects in view and as will become apparent from the following detailed description, the present invention will be more clearly understood in connection with the accompanying drawings, in which:

FIG. 1 is a perspective view of a flange according to the present invention;

FIG. 2 is a perspective view showing how two flange pieces are connected with each other;

FIG. 3 is a plan view of the flange assembled and mounted on a duct; and

FIG. 4 is a slightly enlarged sectional view taken along the line IV—IV of FIG. 3.

According to the present invention, a flange for coupling one duct to another is comprised by four flange pieces A. Each of them is made of thin strip steel and is bent perpendicularly along a longitudinal line so as to produce an L-shaped section formed by a base wall 1 and a flange wall 2. A low rim 3 is formed on the longitudinal edge of the flange wall 2 which is opposite the base wall to serve as a reinforcement. The flange wall 2 has at one end thereof a transverse extension 5 extending past the base wall 1. The rim 3 does not extend along the entire the extension 5. A notch 12 is provided between the extension 5 and the vertical edge of the base wall 1. At the other end of the flange piece A, the base wall 1 is provided with a hook 7. The base of the hook 7 is adapted to fit in the notch 12 of another flange piece A.

In assembling the flange, two flange pieces A are placed at right angles to each other, with the extension 5 of the first flange piece A lapping over the opposite end of the flange wall 2 of the second flange piece A. A rivet 9 is inserted into holes 10 and 11, which are provided in the extension 5 of the first flange piece A and in the opposite end of the flange wall 2 of the second flange piece A, respectively. Then the rivet 9 is calked.

Alternatively, the extension 5 of the first flange piece A may be welded to the second flange piece A.

Then the hook 7 of the second flange piece A is bent so as to engage the end of the base wall 1 of the first flange piece A. A notch 8 is provided so that the hook 7 may be easily bent.

When four flange pieces A have been assembled, they are fixed to the end of a duct 13a by means of rivets 14 inserted into holes 15 in the base walls 1. Another flange is likewise assembled and fixed to the end of another duct 13b. These two flanges are fixed to each other by inserting bolts 16 into holes 17 provided in the flange walls 2 and securing them with nuts 18.

Thus the flange in accordance with the present invention can be easily assembled and mounted on the end of a duct at the job site. In addition, it has a sufficient mechanical strength. The flange pieces can be easily piled up for storage.

While I have disclosed a preferred embodiment of the present invention, it is to be understood that it has been described by way of example only, various other modifications being obvious.

What I claim is:

1. A flange for a polygonal cross-section duct, comprising a plurality of flange pieces connected together in a polygonal flange, each of said flange pieces having a base wall for being secured to the duct and a flange wall connected along one edge of said base wall and extending perpendicular to said base wall and having means for being connected to an opposed flange, said flange wall having a transverse extension at one end of said flange piece extending past said base wall at an angle to the length of said flange piece corresponding to the angle between the walls of the duct, said transverse extension being connected to the flange wall of the flange piece which is next adjacent the one end of said flange piece, and said base wall having a hook at the other end of said flange piece bent around the end of the base wall of the flange piece next adjacent the other end of said flange piece.

2. The flange as claimed in claim 1 in which said flange wall has a rim on the longitudinal edge opposite the edge joined to said base wall for reinforcement of said flange piece.

3. The flange as claimed in claim 1 in which said flange piece has a notch between said extension and the corresponding end of said base wall, said notch receiving the hook of the next adjacent flange piece.

* * * * *